United States Patent [19]

Dixit et al.

[11] 4,245,573

[45] Jan. 20, 1981

[54] AIR HEATER CORROSION PREVENTION

[75] Inventors: Shyam N. S. Dixit; Douglas I. Bain, both of Cincinnati, Ohio; David A. Carter, Barrington, Ill.

[73] Assignee: Chemed Corporation, Cincinnati, Ohio

[21] Appl. No.: 972,276

[22] Filed: Dec. 22, 1978

Related U.S. Application Data

[63] Continuation-in-part of Ser. No. 969,666, Dec. 15, 1978, abandoned.

[51] Int. Cl.³ ................................................. F23J 1/00
[52] U.S. Cl. ...................................... 110/343; 110/203; 110/344; 110/345; 423/244
[58] Field of Search ............... 110/203, 216, 342, 343, 110/344, 345; 423/244 A; 422/9; 252/457

[56] References Cited

U.S. PATENT DOCUMENTS 4,115,518   9/1978   Delmon et al. .................. 423/244 A

FOREIGN PATENT DOCUMENTS 610679  12/1960  Canada ..................................... 252/457
1272897  7/1968  Fed. Rep. of Germany ........... 252/457

*Primary Examiner*—Edward G. Favors
*Attorney, Agent, or Firm*—Charles L. Harness

[57] ABSTRACT

An additive, e. g., MgO.Mg silicate, is injected into the flue gas stream of a coal-or oil-fired furnace, at 2300–1700 deg. F., thereby reducing accumulation of sulfuric acid on the air heater inlet and outlet.

8 Claims, No Drawings

AIR HEATER CORROSION PREVENTION

This application is a Continuation-in-Part of our co-pending application Ser. No. 969,666, filed Dec. 15, 1978, now abandoned. A related case is Ser. No. 107,400, filed Dec. 26, 1979.

The present invention is directed to reduction of corrosion and fouling in the air heater of an industrial furnace or utility boiler burning coal or oil. This is accomplished by injecting an additive into the flue gas stream where the stream has a temperature of about 2300 deg. F. to 1700 deg. F., at a rate of 0.05 to 10.0 pounds of additive per short ton of coal burned. The additive reduces the concentration of free sulphur trioxide in the flue gas. This in turn reduces the dew-point of sulfuric acid and rate of acid build-up at the air heater inlet and outlet to a level which does not promote air heater corrosion and fouling. The additive required is a compound or mixture of two compounds which are capable of forming refractory materials under these conditions. This includes metal oxides themselves, e.g., magnesium oxide, calcium oxide, or silicon dioxide, and also includes compounds which will break down to metal refractory materials at this temperature (2300-1700 deg. F.), e.g. magnesium silicate, calcium silicate, iron silicate, or the like, including mixtures of any of the foregoing. Preferably the additive is a mixture of magnesia and magnesium silicate (suitably in a weight ratio of 3-0.25:1 and preferably 1.5:1) and preferably the additive is added at a zone of the furnace where the temperature is about 2200 deg. F. and at a feed rate of 0.50 to 1.5 pounds per ton of coal or other fuel burned. Preferably the additive is ground or finely divided, e.g., typically 5-7 microns. The additive should exclude any substantial amount of free alumina.

The preferred magnesium silicate is talc. Other useful magnesium silicates include: magnesium trisilicate serpentine, steatite, soapstone, enstatite, and diopside.

As is well known in the furnace art, metal temperatures in air heaters are often below the sulfuric acid dew-point of the flue gases, and hence such metal surfaces face the continual problem of sulfuric acid condensation leading to fouling and corrosion. Use of the present invention not only prevents acid condensation but also keeps heat transfer surfaces in the air heater clean.

PRIOR ART

Industrial or utility boilers burning sulfur containing fossil fuels experience not only the problem of emitting hazardous pollutant in the atmosphere but also pluggage and corrosion in air heaters. Inorganic constituents of the fly ash catalyze the oxidation of sulfur dioxide to sulfur trioxide. Sulfur trioxide combines readily with water vapor in lower temperature zones of the boiler forming corrosive sulfuric acid. Condensed sulfuric acid initiates corrosion, which subsequently leads to fouling and pluggage. Often, acid smut fallout is also associated with unburned carbon and condensed sulfuric acid.

Technical literature of recent years (1,5) (references at the end of this section) shows considerable interest in the area of additive application for preventing cold end acid corrosion and fouling. Basically, published approaches can be grouped into three different categories. It should be noted that classification is strictly based on the method of $SO_3$ removal.

(1) Physical absorption on the finely dispersed phase in the gaseous media, such as silica and alumina. (3,4).

(2) Preferential reaction of atomic oxygen to prevent $SO_3$ formation. (5).

(3) Introduction of materials in the back end of the boiler which selectively combine with sulfur trioxide to form non-corrosive end products. (2,5).

Based on the published data in the literature, the most effective approach in reducing corrosion and fouling of the air heater is introducing a neutralizing agent which selectively combines with sulfuric acid. (5) However, field observation and data appears to indicate that this approach is only partially effective; the reason being that the temperature zone where the neutralizing additive is injected is generally about 600 deg. F. It is probable that a gas to solid phase reaction for sulfur trioxide removal, does not occur. Instead, sulfur trioxide reacts with water vapor forming sulfuric acid, which subsequently condenses on relatively cool heat transfer surfaces. This acid is then neutralized by contact with additive at the surface after condensation.

This method of application, therefore presents certain problems:

(1) The neutralizing additive only neutralizes sulfur trioxide which is condensing as sulfuric acid. Measurements of sulfur trioxide before and after the air heater, with and without additive, will show very little change in the amount of $SO_3$ removed in the air heater with this process.

(2) Neutralization occurs on the cold air heater surfaces by a physical contact process. Therefore the additive must be dispersed over all cold air heater surfaces to insure that all condensing acid is neutralized effectively in stopping cold end corrosion. If there are cold surfaces in the units which do not receive adequate quantities of neutralizing additive, corrosion will still occur on them.

(3) It is very difficult to measure the extent of corrosion protection achieved in the air heater with the application of neutralizing additive. This can only be done by either visual inspection of the unit or by placing corrosion strips in different areas of the air heater in an attempt to measure the effect.

(4) One of the problems associated with sulfuric acid condensation in air heaters is a build up of corrosion debris and fly ash causing pluggage. This can create conditions which force the unit off line for cleaning, leading to decreased availability and costly maintenance. Since the low temperature application of neutralizing additive works as a physical contact process in the air heater, sticky deposits can still occur within the unit causing pluggage and necessitating shut down.

(5) The problem of acid smut emissions is created by condensation of sulfuric acid at some point in the flue gas stream after the air heater. The primary surface available for condensation at that point is the fly ash itself. Condensation in this manner creates the sticky acidic fly ash particulate in the stack known as acid smut. If after leaving the stack this material falls on cars, boats and buildings, corrosive damage is caused due to the presence of sulfuric acid on the surface of the particle. Since the cold end application of a neutralizing additive only removes $SO_3$ condensing as sulfuric acid in the air heater, residual $SO_3$ can still be available to condense at a later stage in the flue gas stream, creating the acid smut emission. If $SO_3$ levels present in the unit, under normal conditions, are so low that condensation of sulfuric acid does not normally occur in the air heater, the concentration of $SO_3$ will not be significantly affected by the cold end application of a neutralizing additive. Thus, an acid smut problem will not be alleviated under these conditions.

This invention reduces $SO_3$ levels in the flue gas before it reaches the air heater. The concentration of $SO_3$ in the flue gas can be reduced well below the point at which condensation will occur. The product of this reaction is a dry powdery sulfate salt. Utilizing this process minimizes the problems mentioned above for the following reasons:

(1) Removal of $SO_3$ from the flue gas stream prior to the air heater allows measurements of $SO_3$ ahead of the air heater (in a temperature zone where no condensation can have occurred), thus allowing direct measurement and comparison of corrosion potential with and without application of additive. This means that the dosage of the additive can be accurately set and maintained to provide protection for the unit with minimal quantities of neutralizing material. We have found that this has enabled utilization of much lower quantities of the additive than in the cold end application.

(2) Since $SO_3$ is effectively removed, protection is afforded equally to all the cold surfaces of an air heater. Thus, the unit can be completely protected with a relatively small dosage of the additive.

(3) Since the product of the reaction of $SO_3$ with the additive is a dry powdery material, no pluggage occurs in the air heater.

(4) Efficient removal of $SO_3$ from the flue gas to a point where no significant condensation of the sulfuric acid can occur in the unit will also minimize the potential for creating acid smut since this is caused by sulfuric acid condensation at some point after the air heater.

In addition to the utilization of the neutralizing materials described in high temperature zones of the boiler, we have found that the introduction of natural minerals in the additive results in activation of the minerals for gas phase reactions. This activation may be caused by the disruption of the original crystal structure, resulting in increased porocity of the dispersed solid phase. This increased surface area with activated adsorption sites increases the efficiency of sulfur trioxide removal from the flue gas. The neutralization and physical adsorption process described above effectively prevents cold end corrosion and fouling.

REFERENCES (1) Reid, W. T., "External Corrosion and Deposit", American Elsevier, New York, N.Y., 1971.

(2) Bennett, R. P., "Chemical Reduction of Sulfur Trioxide and Particulates From Heavy Oil", 171st Symposium on Heavy Fuel Oil Additives, New York, N.Y., April, 1976.

(3) Libutti, B. L., "Efficient Cold End Additives", Symposium on Heavy Fuel Oil Additives, New York, N.Y., April, 1976.

(4) U.S. Pat. No. 3,886,261, May 27, 1975.

(5) Rendle, L. K., "The Prevention of Acid Condensation in Oil-Fired Boilers", Journal of the Institute of Fuel, 372, September, 1956.

The following examples illustrate without limiting the invention. Examples I and II are offered as recommended procedures; they have not been carried out in plant practice. Example III has been carried out in a commercial furnace.

EXAMPLE I

A 120 megawatt designed capacity, cyclone fired boiler, burning Eastern bituminous c coal, was experiencing some corrosion and fouling in the Lungstrum air heater. To lower the sulfuric acid dew point and rate of acid build up, a powdered mixture containing magnesia and magnesium silicate (50:50) is injected into the high temperature zones (2300 to 1900 deg. F.) of the test boiler. Acid dew point of the treated gas at the air heater inlet is reduced, thereby reducing corrosion and fouling.

EXAMPLE II

A 330 megawatt rating, cyclone fired boiler, burning Eastern bituminous c coal, was equipped with preheat steam coils on the forced draft fan to minimize tubular air heater corrosion and fouling. To lower sulfuric acid dew point and rate of sulfuric acid build up, a powdered mixture of magnesia and magnesium silicate is injected into the high temperature zones (2300–1900 deg. F.) of the test boiler. The additive is effective in achieving these objectives.

EXAMPLE III

A 215–217 MWs capacity boiler burning fuel oil No. 6, was experiencing corrosion and fouling of the air heater due to sulfuric acid condensation. Samples of deposit collected from the air heater showed the presence of szomolnokite ($FeSO_4H_2O$) and low pH of 2 in a one percent water slurry. The sulfur content of the fuel oil was in the range of 0.9 to 1.0 percent. The corrosion and fouling of the air heater was occurring in spite of the fact that the air heater was receiving neutralizing additive at the air heater inlet. A 50:50 powdered mixture of magnesia and magnesium silicate (talc) was injected at the rate of 30–31 lb. 1 hour in the high temperature zone of the boiler (2,300 deg. to 1,700 deg F.).

In this run, as regards performance in the flue gas, the highest sulfuric acid dew-point obtained was 270 deg. F. and the highest $SO_3$ levels obtained using modified EPA method were approximately 6 ppm by volume with a flue gas moisture content of approximately 17%. With additive injection the gaseous $SO_3$ levels dropped to 0.5 ppm and the highest acid dew point obtained was 260 deg. F. As regards the air heater, there was no acid build-up. The flue gas temperature in the air heater inlet was 570–580 deg. F. The acid dew point ranged from 240 deg. F. to 260 deg. F. No corrosion or fouling was noted. As regards air heater inlet conditions using the additive, particulate $SO_3$ measured 0.77 ppm on the south side and 0.37 ppm on the north side. Gaseous $SO_3$ measured 0.73 ppm on the south side and 1.28 ppm on the north side. The temperature of the air heater inlet was 555 deg. F. on the south side and 576.7 deg. F. on the north side.

The air heater outlet was in two sections. In section E particulate $SO_3$ measured 0.09 ppm and in Section F 0.02 ppm. Gaseous $SO_3$ measured 1.76 ppm in Section E and 0.96 ppm in Section F. The temperature in Section E was 250 deg. F. and in Section F was 265 deg. F.

The above data contrasts with performance when the additive is omitted, to wit: the rate of acid build-up averaged 100 microamps per minute, as determined by electroconductivity methods. This indicated a high rate of deposition with consequent corrosion and fouling.

Sulfur trioxide in the air heater inlet is also found to be much higher when the additive is omitted. In the south side of the air heaters inlet particulate SO₃ measured 0.02 ppm, the same as on the north side. This value is actually lower than when the additive was used. However, gaseous SO₃ was much higher, when the additive was omitted, namely 5.89 ppm, south side and 3.30 ppm north side. At other stages of the air heater inlet, gaseous SO₃ measured 2.05 and 0.960 ppm. At the outlet particulate SO₃ measured 0.06 ppm, for both the E and F sections; gaseous SO₃ measured 3.57 ppm in Section E and 1.30 ppm for Section F. Thus when using the additive substantially lower results are generally obtainable for gaseous SO₃, both in the air heater inlet and the air heater outlet.

TABLE I

FUEL ANALYSIS AND UNIT OPERATION DATA FOR EXAMPLE III

| Test Parameter | With Additive | Without Additive |
| --- | --- | --- |
| Carbon, % | 82.26 | 86.31 |
| Hydrogen, % | 12.76 | 12.72 |
| Sulfur, % | 1.02 | 0.95 |
| Nitrogen, % | 0.13 | 0.18 |
| Ash, % | 0.08 | 0.04 |
| BTU/lb. | 18,900 | 18,750 |
| Fuel Firing Rate | 103,000 #/hr | 102,569.8 |
| Heat Input | 1946.7 million BTU/Hr. | 1923.18 million BTU/Hr. |
| Theoretical Gas Flow, SCFM[2] | 307,874 | 306,414 |

[1]The data are presented to show substantial equivalence of furnace operations, as to fuel used, heat input, etc., during runs with and without additive. The run without the additive was made in the same furnace on the day following the run with the additive.
[2]Standard cubic feed per minute (dry).

A steel tube probe, one inch in diameter, 4-6 ft. long, was used in Example III to inject the powder into the furnace. The powdered additive is taken off a hopper with a screw feeder which meters the powder into an air conveying system, which delivers the powder to the probe. The air flow is sufficient to cool the probe to resist heat distortion.

Preferred conditions

The preferred additive is a homogeneous ground mixture of magnesia and magnesium silicate, preferably talc, in the respective weight ratio of 3 to 0.25:1, and more preferably 2 to 1:1; a useful commercial ratio is 1.5:1. The MgO: magnesium silicate mixes of this invention are believed to be novel compositions.

This additive is added to the furnace at a temperature in the range of 2300-1700 deg. F., more preferably 2200 deg. F. to 2000 deg. F.; and still more preferably about 2200 deg. F.

The ratio of additive to fuel is, in the case of coal, 0.5 to 1.5 lbs. additive/ton of coal; preferably 0.5 to 1.0 lbs./ton; and even more preferably, about 0.75 lbs/ton. For oil, the rates are about the same.

We claim:

1. Method of reducing corrosion of metal surfaces in an air heater in an industrial or utility fossil fuel furnace comprising injecting an additive into the furnace at a temperature in the range of 2300°-1700° F. at a rate of 0.05-10 lbs. additive/ton of fuel burned; the additive being essentially free of free alumina and consisting essentially of a combination of magnesium oxide and magnesium silicate in a weight ratio of from 2 to 1:1 of magnesia to magnesium silicate.

2. Method according to claim 1 in which the temperature is 2200 to 2000 deg. F.

3. Method according to claim 2 in which the temperature is about 2200 deg. F.

4. Method according to claim 1 where the additive feed is at a rate of 0.5 to 1.5 lbs./ton of fuel burned.

5. Method according to claim 1 in which the magnesia:magnesium silicate ratio is 1.5:1.

6. Method according to claim 4 where the magnesia:magnesium silicate is 1.5:1.

7. Method according to claim 4 where the magnesium silicate is talc.

8. Method according to claim 1 in which the ratio is 1:1 and the magnesium silicate is talc.

* * * * *